United States Patent
Guerfi et al.

(10) Patent No.: US 9,431,675 B2
(45) Date of Patent: Aug. 30, 2016

(54) MATERIAL CONSISTING OF COMPOSITE OXIDE PARTICLES, METHOD FOR PREPARING SAME, AND USE THEREOF AS ELECTRODE ACTIVE MATERIAL

(75) Inventors: Abdelbast Guerfi, Brossard (CA); Jean-François Labrecque, Montreal (CA); Martin Dontigny, Varennes (CA); Patrick Charest, Sante-Julie (CA); Karim Zaghib, Longueuil (CA)

(73) Assignee: HYDRO-QUEBEC, Montreal, Quebec (CA)

( * ) Notice: Subject to any disclaimer, the term of this patent is extended or adjusted under 35 U.S.C. 154(b) by 1204 days.

(21) Appl. No.: 13/394,665

(22) PCT Filed: Sep. 15, 2010

(86) PCT No.: PCT/CA2010/001418
§ 371 (c)(1),
(2), (4) Date: Jun. 5, 2012

(87) PCT Pub. No.: WO2011/032264
PCT Pub. Date: Mar. 24, 2011

(65) Prior Publication Data
US 2012/0237833 A1 Sep. 20, 2012

(30) Foreign Application Priority Data
Sep. 15, 2009 (CA) ..................... 2678540

(51) Int. Cl.
*H01M 6/14* (2006.01)
*H01M 10/052* (2010.01)
(Continued)

(52) U.S. Cl.
CPC ........... *H01M 10/052* (2013.01); *H01M 4/366* (2013.01); *H01M 4/5825* (2013.01); *H01M 4/625* (2013.01); *Y02E 60/122* (2013.01); *Y02P 70/54* (2015.11)

(58) Field of Classification Search
CPC ............ H01M 4/366; H01M 4/5825; H01M 10/052; H01M 4/625; Y02E 60/122
USPC ......................... 429/303, 211, 306
See application file for complete search history.

(56) References Cited

U.S. PATENT DOCUMENTS

2009/0087660 A1* 4/2009 Suzuki ............... H01M 4/366
428/403

FOREIGN PATENT DOCUMENTS

CN 101121509 A 2/2008
CN 101212048 A 7/2008
(Continued)

OTHER PUBLICATIONS

Office Action (Notice of Rejection) issued on Jan. 28, 2014, by the Japanese Patent Office in corresponding Japanese Patent Application No. 2012-529072, and an English Translation of the Office Action. (8 pages).
(Continued)

*Primary Examiner* — Gary Harris
(74) *Attorney, Agent, or Firm* — Buchanan Ingersoll & Rooney P.C.

(57) ABSTRACT

A positive electrode material, having particles having a complex oxide OC1 core, an at least partial complex oxide OC2 coating, and an adhesive carbon surface deposit. The material is characterized in that the complex oxide OC1 is an oxide having a high energy density and in that the oxide OC2 is an oxide of a metal having a catalytic effect on the reaction of the carbon deposit, the oxide having good electronic conductivity. The presence of the OC2 layer facilitates the deposit of a carbon adhesive layer at the surface of the oxide particles, and improves the conductivity of the material when the latter is used as an electrode material. The electrode material can particularly be used in the manufacture of a lithium battery.

20 Claims, 6 Drawing Sheets

(51) Int. Cl.
    *H01M 4/36*     (2006.01)
    *H01M 4/58*     (2010.01)
    *H01M 4/62*     (2006.01)

(56) References Cited

FOREIGN PATENT DOCUMENTS

| | | | |
|---|---|---|---|
| CN | 101453020 A | 6/2009 | |
| JP | 2000306577 A | 11/2000 | |
| JP | 2003272618 A | 9/2003 | |
| JP | 2006302671 A | 11/2006 | |
| JP | 2007103339 A | 4/2007 | |
| JP | 2007-213866 A | 8/2007 | |
| JP | 2008186807 A | 8/2008 | |
| JP | 2008210701 A | 9/2008 | |
| JP | 2008311067 A | 12/2008 | |
| JP | 2009087682 A | 4/2009 | |
| JP | 2009-129721 A | 6/2009 | |
| WO | 2008/091707 A2 | 7/2008 | |
| WO | 2008088180 A1 | 7/2008 | |
| WO | WO 2008088180 A1 * | 7/2008 | ............ H01M 4/366 |
| WO | 2009/010895 A1 | 1/2009 | |
| WO | 2009105863 A1 | 9/2009 | |

OTHER PUBLICATIONS

Office Action (Decision of Rejection) issued on Jul. 10, 2014, by the Japanese Patent Office in corresponding Japanese Patent Application No. 2012-529-072. (3 pages).

Office Action issued on Sep. 2, 2014, by the Chinese Patent Office in corresponding Chinese Patent Application No. 201080040780.2, and an English Translation of the Office Action. (23 pages).

French Search Resport issued Jan. 21, 2014 by the European Patent Office in European Patent Application No. 10 816 510.1 (5 pgs).

International Search Report (PCT/ISA/210) issued on Dec. 2, 2010, by Canadian Patent Office as the International Searching Authority for International Application No. PCT/CA2010/001418.

Written Opinion (PCT/ISA/237) issued on Dec. 2, 2010, by Canadian Patent Office as the International Searching Authority for International Application No. PCT/CA2010/001418.

S.K. Martha et al., "$LiMnPO_4$ as an Advanced Cathode Material for Rechargeable Lithium Batteries", Journal of The Electrochemical Society, 2009 (month unknown), pp. A541-A552, vol. 156, No. 7.

A. Yamada et al., "Structural and magnetic properties of $Li_x(Mn_yFe_{1-y})PO_4$ electrode materials for Li-ion batteries", Journal of Power Sources, Apr. 15, 2009, pp. 1154-1163, vol. 189, No. 2.

Y. Chen et al., "Structure studies on $LiMn_{0.25}Fe_{0.75}Po_4$ by in-situ synchrotron X-ray diffraction analysis", Journal of Power Sources, 2009 (month unknown), pp. 790-793, vol. 189.

Official Action issued by Chinese Patent Office on Jan. 20, 2014 in Chinese Application No. 201080040780.2, and English language translation of Official Action (25 pgs).

* cited by examiner

MATERIAL CONSISTING OF COMPOSITE OXIDE PARTICLES, METHOD FOR PREPARING SAME, AND USE THEREOF AS ELECTRODE ACTIVE MATERIAL

The present invention relates to a material composed of composite particles of inorganic oxide, to a process for the preparation thereof and to the use thereof as electrode active material.

STATE OF THE ART

A lithium battery operates by reversible movement of lithium ions between a negative electrode and a positive electrode, through an electrolyte comprising a lithium salt in solution in a liquid solvent, polymer or gel.

The negative electrode is generally composed of a lithium sheet, a lithium alloy or a lithium-comprising intermetallic compound. The negative electrode can also be composed of a material capable of reversibly inserting lithium ions, such as, for example, graphite or an oxide, said insertion material being used alone or in the form of a composite material additionally comprising at least one binder and one agent which confers conduction of electrons, such as carbon.

Various complex oxides have been studied as active material for the positive electrode, acting as material for the reversible insertion of lithium ions. Mention may in particular be made of the compounds which have an olivine structure and which correspond to the formula $LiMXO_4$, the compounds corresponding to the formula $Li_2MXO_4$ in which M represents at least one transition metal and X represents an element chosen from S, P, Si, B and Ge (for example $Li_2FeSiO_4$) and the compounds of the Nasicon type having a rhombohedral structure which correspond to the formula $Li_xM_2(XO_4)_3$ in which M represents at least one transition metal and X represents at least one element chosen from S, P, Si, B and Ge. These complex oxides are generally used in the form of nanometric or micrometric particles, optionally coated with carbon and/or bonded to one another via carbon bonds. The presence of the carbon improves the electrochemical performance, in particular when it is in the form of an adherent layer on the complex oxide.

Among these oxides, those in which M represents Fe, Mn or Co are advantageous, in particular because of some of their electrochemical properties and of their relatively low cost due to the high availability of the metals. However, they exhibit a few disadvantages. An oxide $LiMXO_4$ in which M is essentially Fe (in particular $LiFePO_4$) has a good electronic conductivity when it is in the form of particles coated with carbon and is used as electrode material. It can be easily obtained in the form of particles coated with an adherent layer of carbon but the energy density is low because of the relatively low voltage (of the order of 3.4 V vs $Li/Li^+$). The oxides $LiMXO_4$ in which M is essentially Mn and/or Co and/or Ni (in particular $LiMnPO_4$, $LiCoPO_4$ and $LiNiPO_4$) have a markedly higher operating voltage (of the order of 4.1 V, 4.8 V and 5.1 V respectively) and consequently a high energy density but it is difficult to obtain them in the form of particles coated with an adherent layer of carbon and they have a relatively low electronic conductivity.

It was then envisaged to use particles having a core of an oxide $LiMPO_4$ and a coating of carbon, M representing Fe partially replaced by Mn. However, the presence of $LiFePO_4$, which has a low potential (3.5 V), brings about a decrease in energy density with respect to the use of $LiMnPO_4$ alone. When the $LiFePO_4$ content is restricted to a value of less than 20% by weight, the voltage of the cathode is dominated by the $LiMnPO_4$ voltage (4.1 V), which limits the decrease in the energy density. A compound $LiFe_{(1-x)}Mn_xPO_4$, which is a solid solution, gives acceptable results when x remains below 0.6, that is to say when the compound $LiFePO_4$ is predominant (Ref. Yamada, J. Power Sources, Volume 189, Issue 2, 15 Apr. 2009, pages 1154-1163). However, it is not possible to increase the contribution of Mn with respect to Fe.

SUMMARY

An object of the present invention is to provide an electrode material which has good performance when it is used as positive electrode active material in a lithium battery, in particular a high energy density and a good electronic and ionic conductivity.

The inventors have found that an adherent layer of carbon on a complex oxide can be easily obtained when the metal of the oxide exerts a catalytic effect on the reaction which results in the deposition of carbon. They have also found that, surprisingly, when a layer of an oxide of a metal is deposited at least on a portion of the surface of particles of a complex oxide having a high energy density, an adherent deposit of carbon is obtained without substantially reducing the operating potential, when said metal has a catalytic effect with regard to said reaction resulting in the deposition of carbon. This makes it possible to increase the electronic conductivity without reducing the energy density.

Consequently, according to one aspect of the present invention, a positive electrode material is provided which is composed of particles having a core of a complex oxide CO1, an at least partial coating of a complex oxide CO2 and an adherent surface deposit of carbon, said material being characterized in that the complex oxide CO1 is an oxide having a high energy density and the oxide CO2 is an oxide of a metal which has a catalytic effect on the reaction for the deposition of carbon, said oxide having a good electronic conductivity. The presence of the CO2 layer has the effect, on the one hand, of facilitating the deposition of an adherent layer of carbon on the surface of the oxide particles and, on the other hand, of improving the conductivity of the material when it is used as electrode material.

According to another aspect of the invention, a process is provided for the preparation of said electrode material.

Another aspect of the invention relates to a composite electrode, the active material of which is the material of the invention, and to a lithium battery, the positive electrode of which comprises said electrode material according to the invention.

Figure 3:
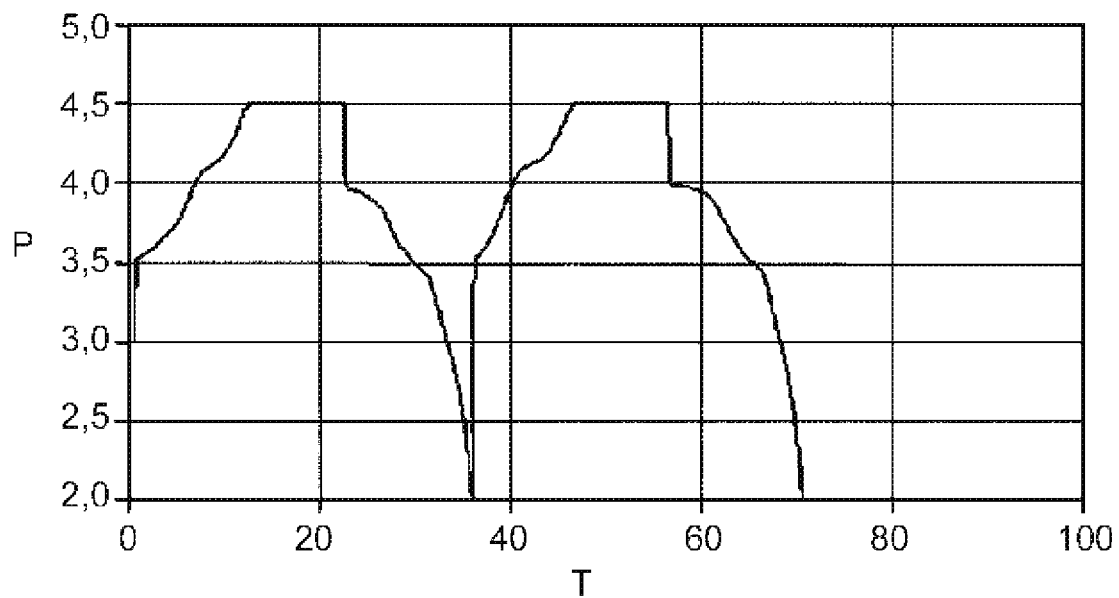
FIGS. 3, 4 and 5 relate to an electrochemical cell having an electrode, the active material of which is composed of $LiMnPO_4$ particles coated with $LiFePO_4$ and with a carbon layer deposited by pyrolysis of cellulose acetate, and they respectively represent.
Figure 4:
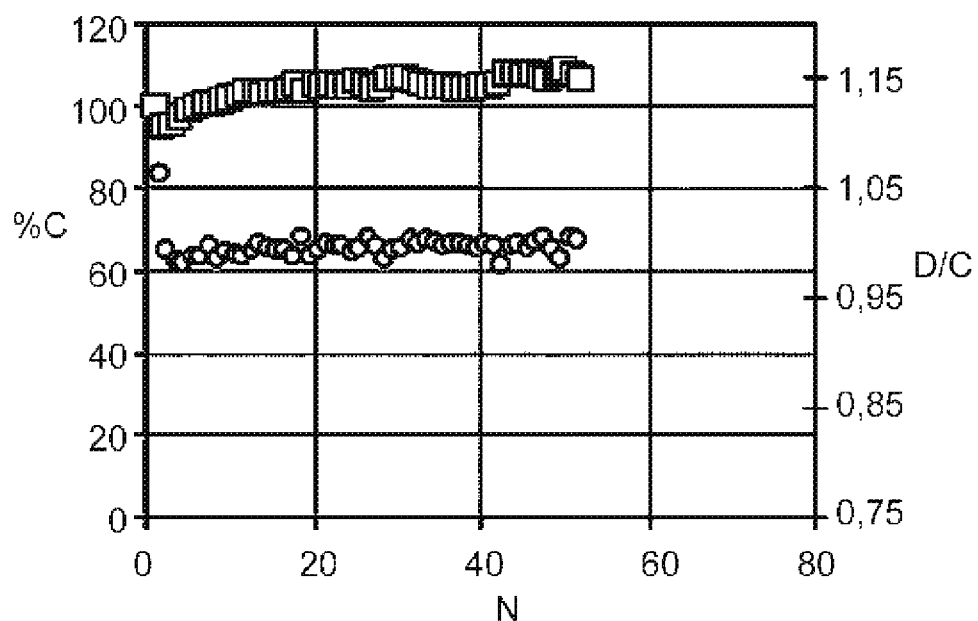
Figure 5:
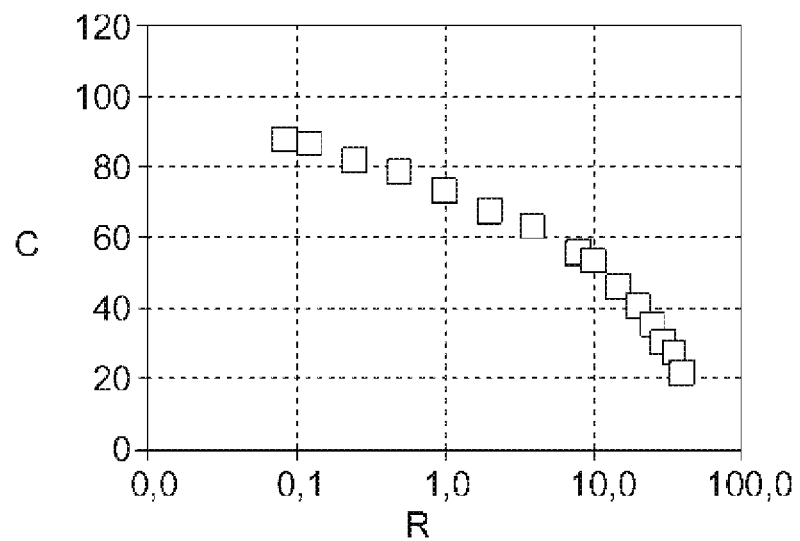

the change in the potential P (in volts) as a function of time T (in hours), during operating at a C/24 rate (FIG. 3);

the percentage of capacity % C (curve represented by ▫▫▫) and the discharge/charge (D/C) ratio (curve represented by ooo), as a function of the number of cycles N (FIG. 4);

the Ragone diagram, that is to say the variation in the capacity C (in mAh/g) as a function of the discharge rate R (FIG. 5).

Figure 6:
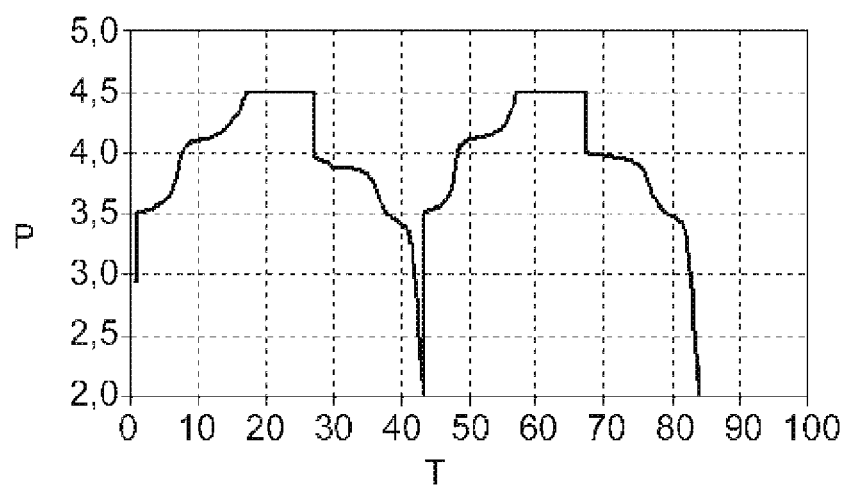
Figure 7:
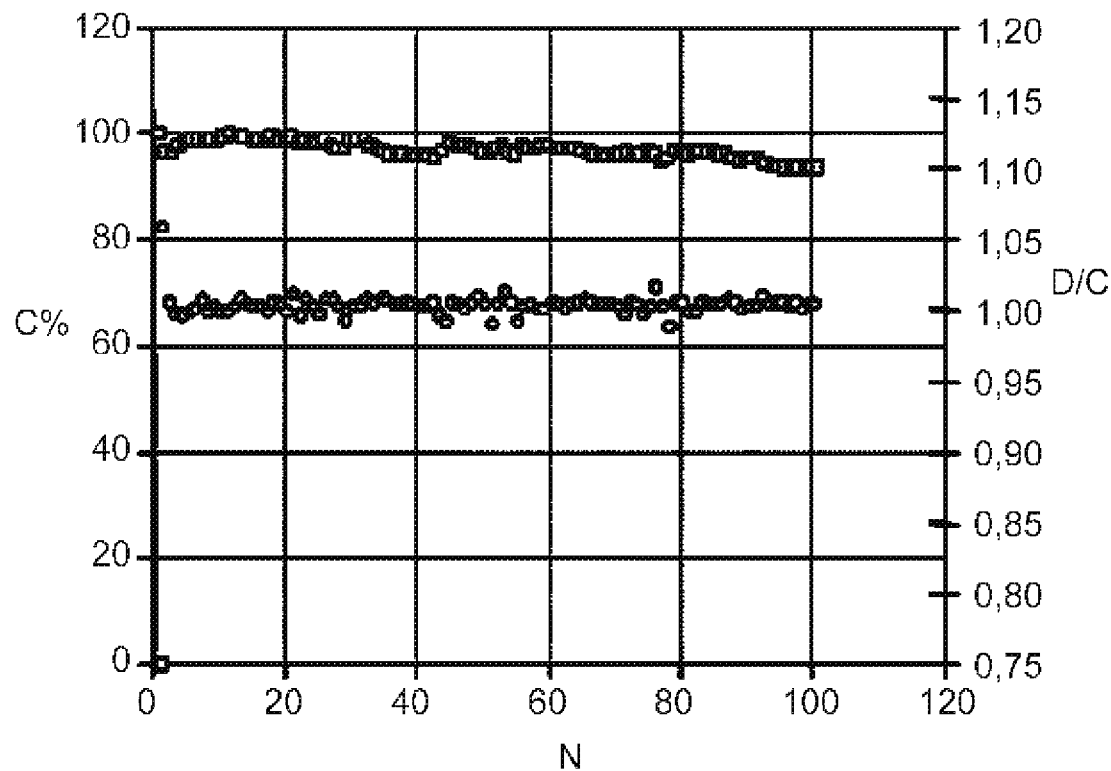
Figure 8:
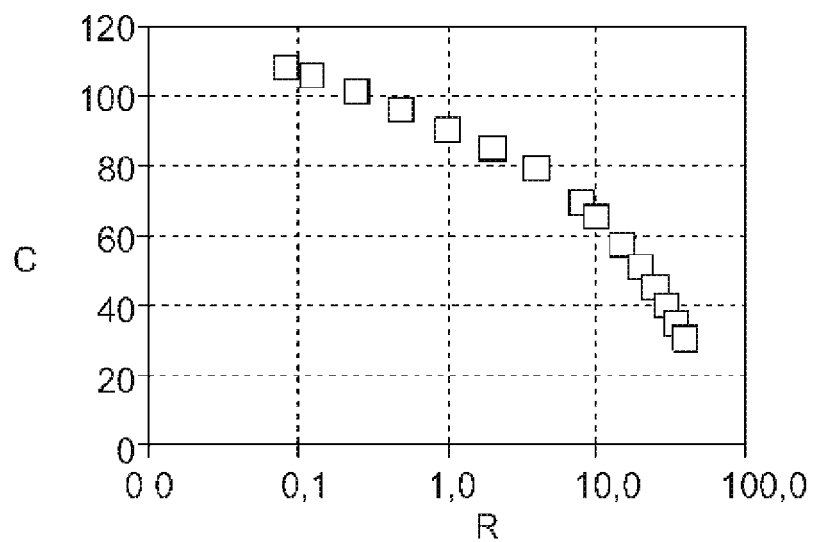

FIGS. 6, 7 and 8 relate to an electrochemical cell having an electrode, the active material of which is composed of $LiMnPO_4$ particles coated with $LiFePO_4$ and with a carbon layer deposited by pyrolysis of lactose, and they respectively represent:

the change in the potential P (in volts) as a function of time T (in hours), during operating at a C/24 rate (FIG. 6);

the percentage of capacity % C (curve represented by ▫▫▫) and the discharge/charge (D/C) ratio (curve represented by ooo), as a function of the number of cycles N (FIG. 7);

the Ragone diagram, that is to say the variation in the capacity C (in mAh/g) as a function of the discharge rate R (FIG. 8).

Figure 9:
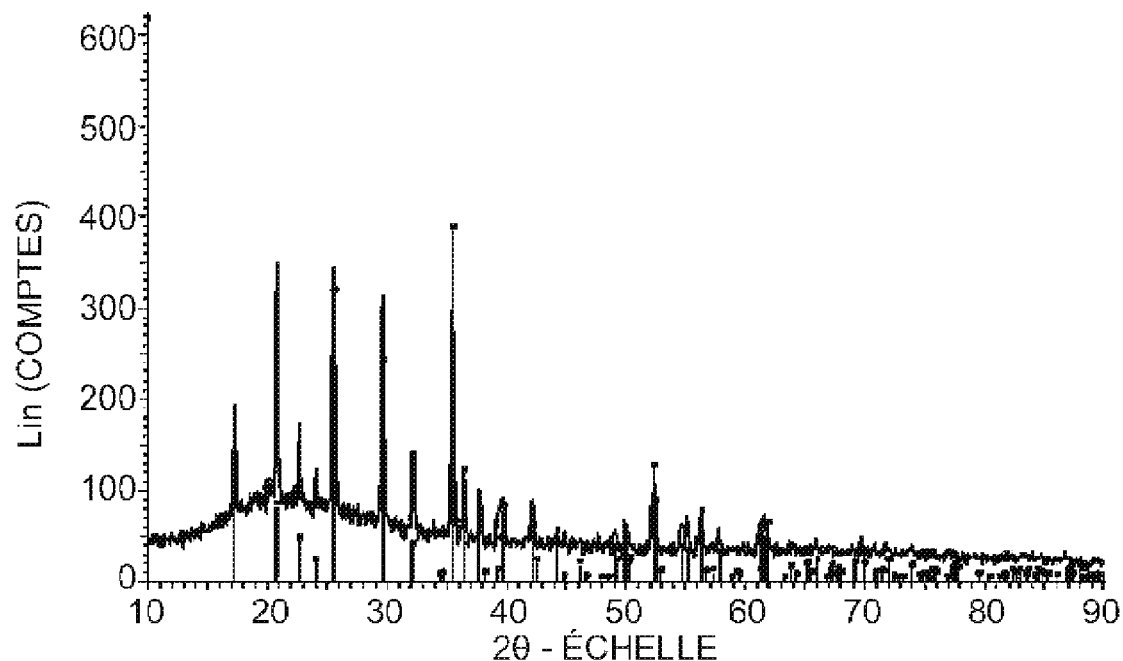

FIG. 9 represents the X-ray diffraction diagram of a compound $LiMn_{0.67}Fe_{0.33}PO_4$.

Figure 10:
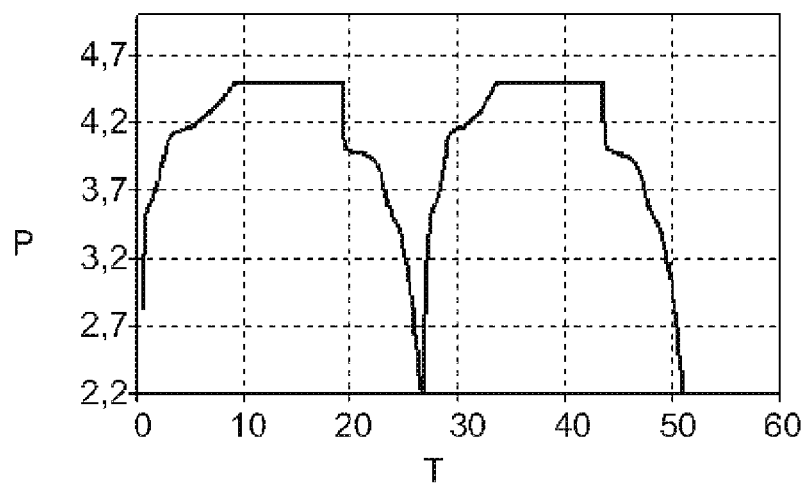
Figure 11:
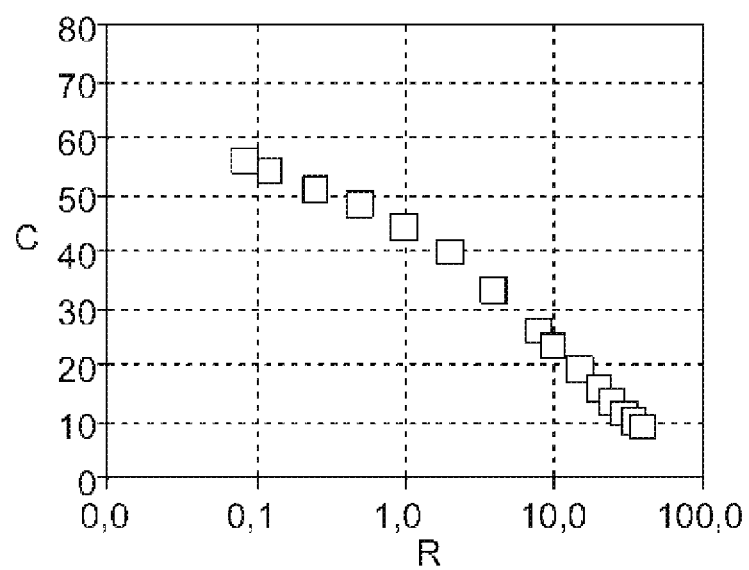

FIGS. 10 and 11 relate to an electrochemical cell having an electrode, the active material of which is composed of $LiMn_{0.67}Fe_{0.33}PO_4$ particles coated with a carbon layer deposited by pyrolysis of cellulose acetate, and they respectively represent:

the change in the potential as a function of time, during operation at a C/24 rate (FIG. 10);

the Ragone diagram, that is to say the variation of the capacity C (in mAh/g) as a function of the discharge rate R (FIG. 11).

DETAILED DESCRIPTION OF THE INVENTION

A first subject matter of the invention is a positive electrode material composed of particles having a core of a complex oxide CO1, an at least partial coating of a complex oxide CO2 and an adherent surface deposit of carbon, said material being characterized in that:

the complex oxide CO1 has a potential of greater than 2.5 V and is chosen from the oxides of an alkali metal and of at least one element chosen from Mn, Co, Ge, Au, Ag and Cu, and the oxide CO2 is an oxide of an alkali metal and of at least one metal which has a catalytic effect on the reaction for the deposition of carbon and which is chosen from Fe, Mo, Ni, Pt and Pd.

The alkali metal A is chosen from Li, Na and K, Li being particularly preferred. Preferably, the alkali metal is the same in both oxides.

The oxide CO1 can be an oxide $A_zM^1_{(1-a)}M^2_aXO_4$ in which $M^1$ represents at least one element chosen from Mn, Co, Cu and Ge, $M^2$ represents a transition metal other than Mn and Co, $0 \leq a \leq 0.5$, $0 \leq z \leq 2$ and X represents an element chosen from P, Si, V and Ti, in particular an oxide $LiMnPO_4$ in which Mn can be partially replaced by Co and/or Ni. The oxide $LiMnPO_4$ is particularly preferred.

The oxide CO2 can be an oxide $A_zM^3_{(1-b)}M^4_bX'O_4$ or an oxide $A_x[M^3_{(1-c)}M^4_c)_2(X''O_4)_3]$ in which $M^3$ represents at least one element chosen from Fe, Mo, Pt and Pd, $M^4$ represents a transition metal other than $M^3$, $0 \leq 4b \leq 0.5$, $0 \leq c \leq 0.5$, $0 \leq x \leq 3$, $0 \leq z \leq 2$, and X' or X'' represents at least one element chosen from P, Si, S, V, Ti and Ge. In addition, the oxide CO2 can be an oxide $LiFeBO_3$. The oxides $LiFePO_4$, $LiFeVO_4$, $Li_2FeSiO_4$, $LiFeTiO_4$ and $Li_2FeGeO_4$ are particularly preferred as oxide CO2, more particularly $LiFePO_4$.

The material according to the invention is prepared from the precursors of its constituent elements. The preparation process comprises the following stages:

a) preparation of particles of oxide CO1 from its precursors;

b) introducing the particles of oxide CO1 into a solution of precursors of the oxide CO2 and carrying out a heat treatment in order to bring about the reaction of the precursors of the oxide CO2;

c) bringing the particles of oxide CO1 carrying a coating of oxide CO2 into contact with an organic precursor of carbon and carrying out a heat treatment so as to reduce the organic precursor to carbon.

An Li precursor is chosen from lithium oxide $Li_2O$, lithium hydroxide, lithium carbonate $Li_2CO_3$, the neutral phosphate $Li_3PO_4$, the acid phosphate $LiH_2PO_4$, lithium orthosilicate, lithium metasilicate, lithium polysilicates, lithium sulfate, lithium oxalate and lithium acetate. Several precursors can be used simultaneously. The lithium precursor is preferably $Li_2CO_3$.

An iron precursor can be chosen from iron(III) oxide, magnetite $Fe_3O_4$, iron(III) phosphate, iron(III) nitrate, iron (III) sulfate, lithium iron hydroxyphosphate, iron(III) sulfate and iron(III) nitrate.

A manganese precursor can be chosen from manganese dioxide, manganese nitrate $Mn(NO_3)_2 \cdot 4H_2O$ and manganese sulfate $MnSO_4 \cdot H_2O$.

The Ni precursor can be chosen from the sulfate $NiSO_4 \cdot 6H_2O$, the nitrate $Ni(NO_3)_2 \cdot 6H_2O$, the acetate $Ni(CH_3COO)_2 \cdot 4H_2O$, nickel oxalate $NiC_2O_4 \cdot 2H_2O$ and the phosphate $Ni_3(PO_4)_2 \cdot 7H_2O$.

The Co precursor can be chosen from the oxide $Co_3O_4$, the nitrate $Co(NO_3)_2 \cdot 6H_2O$, the acetate $Co(CH_3COO)_2 \cdot 4H_2O$, the cobalt(II) sulfate, cobalt nitrate, cobalt oxalate $CoC_2O_4 \cdot 2H_2O$ and the phosphate $Co_3(PO_4)_2$.

Divanadium pentoxide can be used as V precursor.

When X or X' is P and when the Li or M precursor is not a phosphate, phosphoric acid $H_3PO_4$ or di ammonium hydrogen phosphate $(NH_4)_2HPO_4$ can be used as P precursor.

When X or X' is S, the S precursor can be $(NH_4)_2SO_4$.

When X or X' is Ge, the Ge precursor can be a tetraalkylammonium germanate.

In an advantageous embodiment, use is made of at least one compound among those mentioned above which is a precursor of several constituent elements of the oxide.

The preparation of the CO1 particles in stage a) can be carried out by the processes known in the prior art, consisting in at least partially dissolving the precursors in a carrier liquid, in applying a heat treatment in order to bring about the reaction of the precursors and to give rise to the precipitation of the oxide CO1, in allowing the reaction medium to cool, in recovering the particles, in washing them and in drying them. The temperature of the heat treatment is advantageously from 120° C. to 250° C. The drying temperature is advantageously between 80 and 140° C.

In stage b), the heat treatment is advantageously carried out at a temperature of between 120° C. and 250° C., and the recovery of the composite particles is carried out in a way analogous to that of stage a).

In stages a) and b), the carrier liquid for the precursors is advantageously water, preferably demineralized and degassed water.

Stage c) can be carried out in different ways.

According to a first embodiment, the deposition of carbon on the composite particles having a core of a complex oxide CO1 and a coating of complex oxide CO2 can be carried out by pyrolysis of an organic precursor. The organic precursor subjected to the pyrolysis can be chosen from hydrocarbons and their derivatives, particularly polycyclic aromatic entities, such as tar or pitch, perylene and its derivatives, polyhydric compounds, such as sugars and carbohydrates, their derivatives, and polymers. Mention may be made, as examples of polymers, of polyolefins, polybutadienes, polyvinyl alcohol, the condensation products of phenols, including those obtained from reaction with aldehydes, the polymers derived from furfuryl alcohol, the polymers derived from styrene, divinylbenzene, naphthalene, perylene, acrylonitrile and vinyl acetate, cellulose, starch and their esters and ethers, and their mixtures. When the precursor is soluble in water (for example, glucose, lactose and their derivatives), the pyrolysis can be carried out on the precursor in aqueous solution. The pyrolysis is generally carried out at temperatures between 100 and 1000° C.

According to a second embodiment, the deposition of carbon on the complex particles can be carried out by bringing said complex particles into contact with a compound which has one or more carbon-halogen bonds and reducing said compound, according to the reaction scheme CY—CY+2e$^-$=>—C=C—+2Y$^-$, in which Y represents a halogen or a pseudohalogen. This reaction can be carried out at low or moderate temperatures below 400° C. Pseudohalogen is understood to mean an organic or inorganic radical capable of existing in the form of a Y$^-$ ion and of forming the corresponding protonated compound HY. Mention may in particular be made, among halogens and pseudohalogens, of F, Cl, Br, I, CN, SCN, CNO, OH, $N_3$, $RCO_2$ or $RSO_3$, R representing H or an organic radical. The formation by reduction of CY bonds is preferably carried out in the presence of reducing elements, for example hydrogen, zinc, magnesium, $Ti^{3+}$, $Ti^{2+}$, $SM^{2+}$, $Cr^{2+}$ or $V^{2+}$ ions, tetrakis (dialkylamino)-ethylenes or phosphines. Mention may be made, among compounds capable of generating carbon by reduction, of perhalocarbons, in particular in the form of polymers, such as hexachlorobutadiene and hexachlorocyclo-pentadiene.

According to a third embodiment, the deposition of carbon on the complex particles can be carried out by bringing said complex particles into contact with a compound which has one or more —CH—CY— bonds and eliminating the hydrogenated compound HY, Y being as defined above, by a low-temperature reaction according to the reaction scheme —CH—CY—+B=>—C=C—+BHY. Mention may be made, as examples of compounds which can be used in this embodiment, of organic compounds comprising an equivalent number of hydrogen atoms and of Y groups, such as hydrohalocarbons, in particular the polymers, such as polyfluorides, polychlorides, polybromides, polyvinylidene acetates and carbohydrates. The dehydro(pseudo)halogenation can be obtained at low temperature, including ambient temperature, by the action of a base capable of reacting with the HY compound to form a salt. The base can be a tertiary base, chosen in particular from amines, amidines, guanidines or imidazoles, or an inorganic base, chosen from alkali hydroxides and organometallic compounds behaving as strong bases, such as $AN(Si(CH_3)_3)_2$, $LiN[CH(CH_3)_2]_2$ and butyllithium.

A material according to the invention is of particular use as active material of the positive electrode of a lithium battery. The positive electrode is composed of a composite material deposited on a current collector. The current collector is a metal stable toward oxidation which can be aluminum, titanium or a stainless steel. The composite material comprises at least 60% by weight of material according to the invention, optionally a binder and/or an additive which confers electronic conduction. The binder can be a poly(vinylidene fluoride) or PVDF, a poly(vinylidene fluoride-co-hexafluoropropene) copolymer or PVDF-HFP, a poly(tetrafluoroethylene) or PTFE, a poly (ethylene-co-propylene-co-5-methylene-2-norbornene) (EPDM), or a poly(methyl methacrylate) or PMMA, and it represents at most 15% by weight of the composite material. The electronic conduction additive is advantageously chosen from carbon-based materials, in particular carbon blacks, acetylene blacks and graphites, and it represents at most 25% by weight of the composite material.

The electrode according to the invention can be used in a battery, the negative electrode of which is a sheet of lithium or of intermetallic lithium alloy, or a material capable of reversibly inserting lithium ions. The electrolyte comprises at least one lithium salt in solution in a solvent which can be chosen from polar aprotic liquid solvents optionally gelled by addition of a polymer, and solvating polymers optionally plasticized by an aprotic liquid solvent. The lithium salt can be chosen from the salts conventionally used in ionic conduction materials for electrochemical devices operating by exchange of lithium ions. Mention may be made, by way of examples, of $(CF_3SO_2)_2NLi$ (LiTFSI), $(CF_3SO_2)_2CHLi$, $(CF_3SO_2)_3CLi$, $CF_3SO_3Li$, $LiClO_4$, $LiPF_6$, $LiBF_4$, $LiAsF_6$, LiBOB, LiFSI or LiI.

The present invention is described below in more detail with the help of implementational examples, to which, however, it is not limited.

EXAMPLE 1

$LiMnPO_4$ Particles Coated with $LiFePO_4$

Preparation of $LiMnPO_4$ Particles

The following were prepared under a nitrogen atmosphere:
  a solution A, by dissolution of 4.62 g of $LiOH.H_2O$ in 30 ml of demineralized and degassed water;
  a solution B, by dissolution of 9.27 g of $Mn(NO_3)_2.4H_2O$ in 50 ml of demineralized and degassed water;
  a solution C, by dissolution of 4.0 g of an 85% aqueous $H_3PO_4$ solution in 10 ml of demineralized and degassed water.

Solutions B and C were mixed and then solution A was gradually added thereto. It was found that the viscosity of the reaction medium increases as solution A is added, and the final pH measured is 6.6. In the reaction medium thus obtained, the Mn concentration is 0.4M and the Li/Mn/P ratio is 3/1/1.

The reaction medium was subsequently poured under a nitrogen atmosphere into a PTFE container incorporated in a pressurizable stainless steel chamber (Parr, volume of 325 ml) and the setup was placed in an oven at 220° C. for 7 hours and then cooled to ambient temperature. The precipitated powder was recovered by filtration, washed 3 times with 100 ml of distilled water and then dried in an oven at 90° C. under nitrogen for 12 h.

Figure 1:
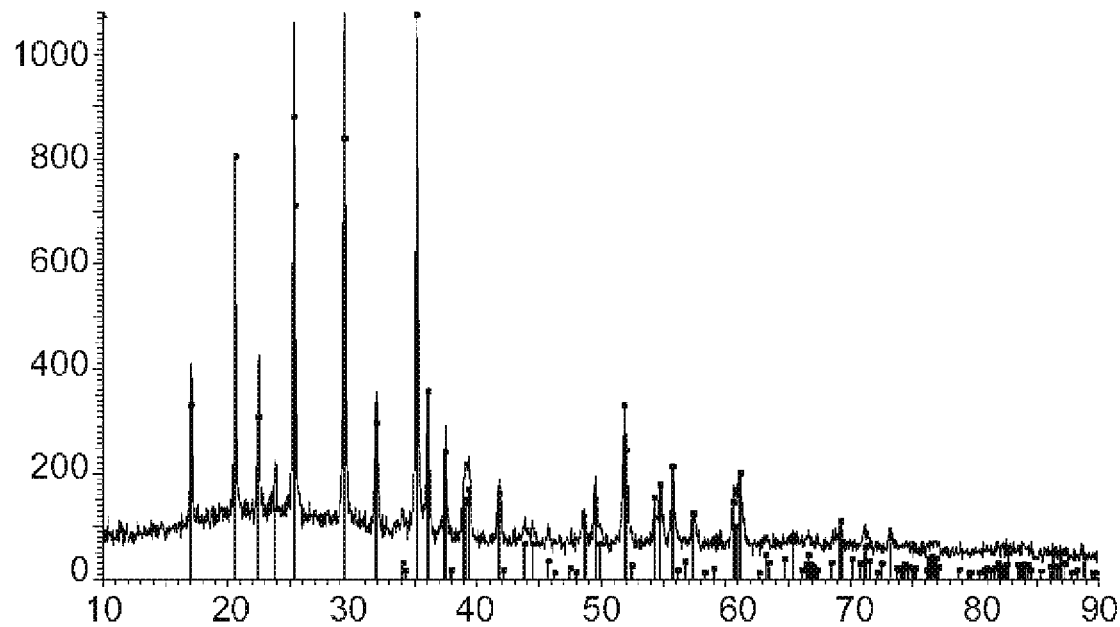
FIG. 1 represents the X-ray diffraction diagram of $LiMnPO_4$ prepared according to example 1.

The entire process was repeated twice and 12 g of a compound in the form of a beige-colored powder were thus obtained. The X-ray diffraction diagram is represented in FIG. 1. It shows that the compound is a single phase which exhibits an orthorhombic structure, the parameters of which are a=10.43100 Å; b=6.09470 Å; c=4.773660 Å.

Coating of the LiMnPO4 Particles with LiFePO$_4$

The following were prepared under a nitrogen atmosphere:
- a solution D, by dissolution of 3.08 g of LiOH.H$_2$O in 40 ml of demineralized and degassed water;
- a solution E, by dissolution of 10.0 g of FeSO$_4$.7H$_2$O and 4.75 g of (NH$_4$)$_2$HPO$_4$ in 50 ml of demineralized and degassed water.

Solution D was gradually added to solution E. As above, the viscosity increases as solution D is added, and the final pH measured is 10.3. The Li/Fe/P ratio in the solution of LiFePO$_4$ precursors thus obtained is 2/1/1.

10 g of LiMnPO$_4$ particles prepared according to the above procedure were introduced into this solution of precursors. The reaction medium thus obtained was poured under a nitrogen atmosphere into a PTFE container incorporated in a pressurizable stainless steel chamber (Parr, volume of 325 ml) and the setup was placed in an oven at 220° C. for 7 hours and then cooled to ambient temperature.

The compound which precipitated was recovered by filtration, washed 3 times with 100 ml of distilled water and then dried in an oven at 90° C. under nitrogen for 12 h.

Figure 2:
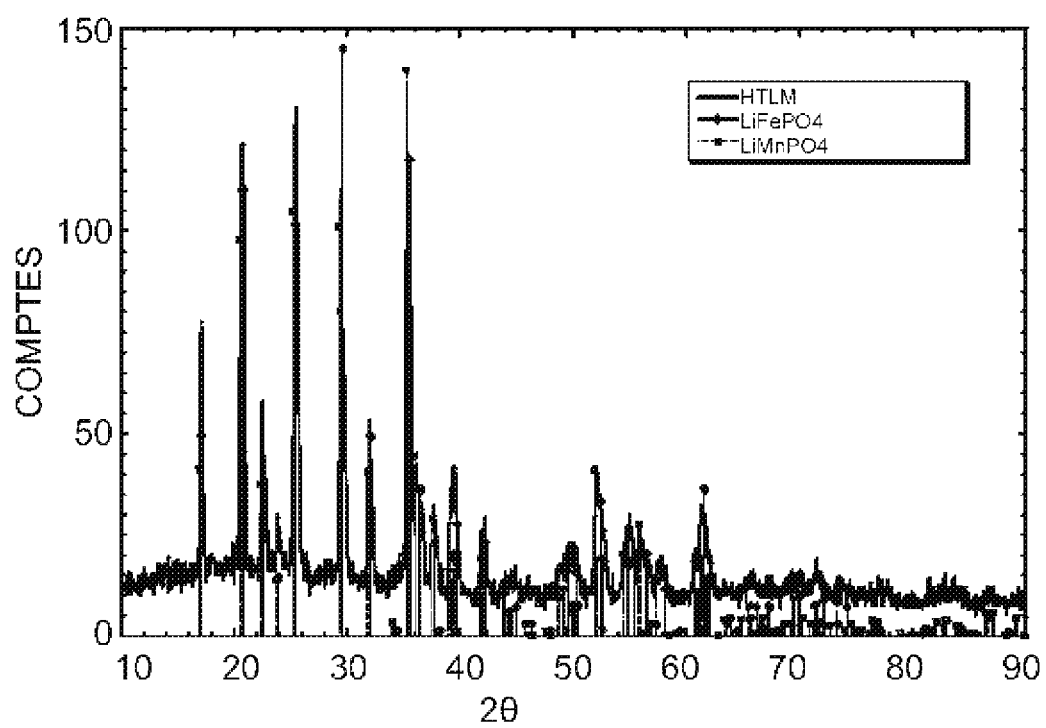
FIG. 2 represents the X-ray diffraction diagram of $LiMnPO_4$ particles coated with $LiFePO_4$ prepared according to example 1.

15.1 g of a compound in the form of a beige-colored powder were thus obtained. The X-ray diffraction diagram is represented in FIG. 2. In this figure:
- the peaks identified by the symbol ♦ correspond to the compound LiFePO$_4$;
- the peaks identified by the symbol □ correspond to the compound LiMnPO$_4$.

It is thus apparent that the compound obtained comprises the LiFePO$_4$ phase and the LiMnPO$_4$ phase, which both have the olivine structure and the orthorhombic phase with different lattice parameters:

LiMnPO$_4$ a=10.43100, b=6.09470, c=4.73660
LiFePO$_4$ a=6.01890, b=10.34700, c=4.70390

Deposition of Carbon

The compound obtained in the preceding stage was introduced into a solution of cellulose acetate in an acetone/isopropanol (1/1) mixture, the acetate/[LiMnPO$_4$]LiFePO$_4$ ratio being 1/7, and then the reaction medium was subjected, under an inert atmosphere, to a heat treatment comprising a stage of 1 h at 400° C. followed by a stage of 3 h at 600° C. The final material was obtained in the form of a grayish-black powder.

Characterization

The electrochemical performance of the material obtained was determined in an electrochemical cell in which said material constitutes the cathode, the anode is of lithium metal and the electrolyte is a 1M solution of LiPF$_6$ in an EC/DEC 50/50 mixture, with a theoretical rate of C/24.

FIG. 3 represents the change in the potential as a function of time, during operation at a C/24 rate, which corresponds theoretically to a 48 h cycle. FIG. 3 shows a cycle time of 36 h, owing to the fact that not all the theoretical capacity is obtained. It also shows the presence of a first plateau at 3.5 V, corresponding to Fe, and a second plateau at 4.0 V, corresponding to Mn. In order to avoid degradation of the solvent of the electrolyte, the potential is maintained at 4.5 V instead of raising it further and thus the capacity of the first charge is limited to 94.9 mAh/g (instead of the theoretical value of 170 mAh/g), which is equivalent to a level x of lithium extracted from the material such as x=0.558.

FIG. 4 represents the percentage of capacity (left-hand ordinate) and the discharge/charge (D/C) ratio (right-hand ordinate), as a function of the number of cycles. During the cycles, charging is carried out at a C/4 rate and discharging is carried out at a 1 C rate. FIG. 4 shows that the reversible capacity is 99.5 mAh/g and that the efficiency (D/C ratio) remains substantially maintained at about 99%.

FIG. 5 represents the Ragone diagram of the material, that is to say the variation of the capacity as a function of the discharge rate. It shows that, at a rate of 10 C, the capacity delivered is 53 mAh/g.

EXAMPLE 2

LiMnPO$_4$ Particles Coated with LiFePO4

The procedure of example 1 was repeated for the preparation of the LiMnPO$_4$ particles coated with LiFePO4.
Deposition of Carbon The LiMnPO$_4$ particles coated with LiFePO$_4$ were introduced into a solution of lactose in water, the lactose/[LiMnPO$_4$]LiFePO$_4$ ratio being 1/10, and then the reaction medium was subjected to a heat treatment under an inert atmosphere comprising a stage of 1 h at 400° C. followed by a stage of 3 h at 600° C. The final material was obtained in the form of a grayish-black powder.
Characterization The electrochemical performance of the material obtained was determined in the same way as in example 1. FIG. 6 represents the change in the potential as a function of the time. It shows that the capacity of the first charge is 116 mAh/g, which is equivalent to a level of lithium extracted from the material x=0.682.

FIG. 7 represents the percentage of capacity (left-hand ordinate) and the discharge/charge (D/C) ratio (right-hand ordinate), as a function of the number of cycles. During the cycles, charging is carried out at a C/4 rate and discharging is carried out at a 1 C rate. FIG. 7 shows that the reversible capacity is 119.3 mAh/g and that the D/C ratio remains substantially constant.

FIG. 8 represents the Ragone diagram of the material, that is to say the variation of the capacity as a function of the discharge rate. It shows that, at a 10 C rate, the capacity delivered is 65.5 mAh/g.

COMPARATIVE EXAMPLE

LiMn$_{0.67}$Fe$_{0.33}$PO$_4$ Particles

By way of a comparison, particles of a phosphate LiMPO$_4$, in which M represents Fe partially replaced by Mn, were prepared and a carbon coating was deposited on said particles by carbonization of a carbon-based precursor in the same way as in example 1.
Preparation of LiMn$_{0.67}$Fe$_{0.33}$PO$_4$ Particles The following were prepared under a nitrogen atmosphere:
- a solution A, by dissolution of 4.62 g of LiOH.H$_2$O in 30 ml of demineralized and degassed water;
- a solution F, by dissolution of 3.33 g of FeSO$_4$.7H$_2$O, 4.02 g of MnSO$_4$.H$_2$O and 4.75 g of (NH$_4$)$_2$HPO$_4$ in 50 ml of demineralized and degassed water.

Solution A was gradually added to solution F. It was found that the viscosity of the reaction medium increases as solution A is added, and the final pH measured is 10.7. In the reaction medium thus obtained, the Li/Mn/Fe/P ratio is 3/0.66/0.33/1.

The reaction medium was subsequently poured, under a nitrogen atmosphere, into a PTFE container incorporated in a pressurizable stainless steel chamber (Parr, volume of 325 ml), and the setup was placed in an oven at 220° C. for 7 hours and then cooled to ambient temperature. The precipitated powder was recovered by filtration, washed 3 times with 100 ml of distilled water and then dried in an oven at 90° C. under nitrogen for 12 h.

6.2 g of a compound in the form of a powder having a light-gray color were thus obtained. The X-ray diffraction diagram is represented in FIG. 9. It shows that the compound is a single phase which exhibits an orthorhombic structure.

Deposition of Carbon

The compound obtained in the preceding stage was introduced into a solution of cellulose acetate in an acetone/isopropanol (1:1) mixture, the acetate/LiMn$_{0.67}$Fe$_{0.33}$PO$_4$ ratio being 1/7, and then the reaction medium was subjected to a heat treatment under an inert atmosphere comprising a stage of 1 h at 400° C. followed by a stage of 3 h at 600° C. The final material was obtained in the form of a grayish-black powder.

Characterization

The electrochemical performance of the material obtained was determined in the same way as in example 1.

FIG. 10 represents the change in the potential as a function of the time. It shows that the capacity of the first charge is 54.5 mAh/g, which is equivalent to a level of lithium extracted from the material x=0.32. The reversible capacity is 55.7 mAh/g.

FIG. 11 represents the Ragone diagram of the material. It shows that, at a 10 C rate, the capacity delivered is 23.3 mAh/g.

It is thus apparent that, for materials having a similar global composition, the "particles comprising an LiMnPO$_4$ nucleus coated with LiFePO$_4$" form gives an electrochemical performance which is markedly superior to that of the "particles of a complex oxide LiFe$_{1-n}$Mn$_n$PO$_4$" form, the particles carrying, in both cases, a carbon deposit.

The invention claimed is:

1. A positive electrode material composed of particles having a core of a complex oxide CO1, an at least partial coating of a complex oxide CO2 and an adherent surface deposit of carbon, wherein:
   the complex oxide CO1 has a potential of greater than 2.5 V and comprises a first alkali metal and at least one metal selected from the group consisting of Mn, Co, Ge, Au, Ag and Cu, and
   the oxide CO2 comprises a second alkali metal and at least one metal selected from the group consisting of Fe, Mo, Ni, Pt and Pd; and
   wherein the core of oxide CO1 has a mean size from 20 nm to 100 μm, the coating of oxide CO2 has a thickness from 1 nm to 6 μm and the carbon deposit has a thickness from 0.1 nm to 100 nm.

2. The material as claimed in claim 1, wherein the first alkali metal is chosen from Li, Na and K.

3. The material as claimed in claim 2, wherein the first and second alkali metals are the same.

4. The material as claimed in claim 1, wherein the oxide CO1 is an oxide A$_z$M$^1_{(1-a)}$M$^2_a$XO$_4$ in which M$^1$ represents at least one metal selected from the group consisting of Mn, Co, Cu and Ge, M$^2$ represents a transition metal other than Mn and Co, 0≤a≤0.5, 0≤z≤2 and X represents an element selected from the group consisting of P, Si, V and Ti.

5. The material as claimed in claim 4, wherein the oxide CO1 is LiMnPO$_4$ in which Mn can be partially replaced by Co and/or Ni.

6. The material as claimed in claim 1, wherein the oxide CO2 is:
   LiFeBO$_3$; or
   oxides A$_z$M$^3_{(1-b)}$M$^4_b$X'O$_4$ and oxides A$_x$[M$^3_{(1-c)}$M$^4_c$)$_2$(X"O$_4$)$_3$] in which M$^3$ represents at least one metal selected from the group consisting of Fe, Mo, Pt and Pd, M$^4$ represents a transition metal other than M$^3$, 0≤b≤0.5, 0≤c≤0.5, 0≤x≤3, 0≤z≤2, and X' or X" represents at least one element selected from the group consisting of P, Si, S, V, Ti and Ge.

7. The material as claimed in claim 6, wherein the oxide CO2 is selected from the group consisting of LiFePO$_4$, LiFeVO$_4$, Li$_2$FeSiO$_4$, LiFeTiO$_4$ and Li$_2$FeGeO$_4$.

8. A process for the preparation of a material as claimed in claim 1, wherein it comprises the following stages:
   a) preparation of particles of oxide CO from its precursors;
   b) introducing the particles of oxide CO1 into a solution of precursors of the oxide CO2 and carrying out a heat treatment in order to bring about the reaction of the precursors of the oxide CO2;
   c) bringing the particles of oxide CO1 carrying a coating of oxide CO2 into contact with an organic precursor of carbon and carrying out a heat treatment so as to reduce the organic precursor to carbon.

9. The process as claimed in claim 8, wherein the preparation of the CO1 particles in stage a) is carried out by a process consisting in at least partially dissolving the precursors in a carrier liquid, in applying a heat treatment in order to bring about the reaction of the precursors and to give rise to the precipitation of the oxide CO1, in allowing the reaction medium to cool, in recovering the particles, in washing them and in drying them.

10. The process as claimed in claim 9, wherein the heat treatment is carried out at a temperature of between 120° C. and 250° C.

11. The process as claimed in claim 8, wherein the heat treatment of stage b) is carried out at a temperature of between 120° C. and 250° C.

12. The process as claimed in claim 8, wherein stage c) is carried out according to one of the following methods:
   pyrolysis of an organic precursor chosen from hydrocarbons and their derivatives, polyhydric compounds and polymers;
   bringing the complex particles resulting from stage b) into contact with a compound which has one or more carbon-halogen bonds and reducing said compound at low or moderate temperatures below 400° C.;
   bringing the complex particles resulting from stage b) into contact with a compound which has one or more —CH—CY— bonds and eliminating the hydrogenated compound HY by a low-temperature reaction, according to the reaction scheme —CH—CY—+B=>—C═C—+BHY, in which Y denotes a halogen or a pseudohalogen and B denotes a base.

13. An electrode composed of a composite material deposited on a current collector, wherein said composite material comprises a material as claimed in claim 1 as active material.

14. The electrode as claimed in claim 13, wherein the current collector is a metal stable toward oxidation chosen from aluminum, titanium and stainless steel.

15. The electrode as claimed in claim 13, wherein the composite material comprises at least 60% by weight of active material, a binder and/or an additive which confers electronic conduction.

16. A battery comprising a positive electrode, a negative electrode and an electrolyte, in which the negative electrode is a sheet of lithium or of intermetallic lithium alloy, or a material capable of reversibly inserting lithium ions, and the electrolyte comprises at least one lithium salt in solution in a solvent which can be chosen from polar aprotic liquid solvents optionally gelled by addition of a polymer, and solvating polymers optionally plasticized by an aprotic liquid solvent, wherein the positive electrode is an electrode as claimed in claim 13.

17. The process as claimed in claim 8, wherein the oxide CO1 is an oxide of the formula $A_zM^1_{(1-a)}M^2_aXO_4$ in which $M^1$ represents at least one element selected from Mn, Co, Cu and Ge, $M^2$ represents a transition metal other than Mn and Co, $0 \leq a \leq 0.5$, $0 \leq z \leq 2$ and X represents an element chosen from P, Si, V and Ti.

18. The process as claimed in claim 8, wherein the oxide CO1 is $LiMnPO_4$ in which Mn can be partially replaced by Co and/or Ni.

19. The process as claimed in claim 8, wherein the oxide CO2 is selected from:

$LiFeBO_3$;

the oxides $A_zM^3_{(1-b)}M^4_bX'O_4$ and the oxides $A_x[M^3_{(1-c)}M^4_c)_2(X''O_4)_3]$ in which $M^3$ represents at least one element chosen from Fe, Mo, Pt and Pd, $M^4$ represents a transition metal other than $M^3$, $0 \leq b \leq 0.5$, $0 \leq c \leq 0.5$, $0 \leq x \leq 3$, $0 \leq z \leq 2$, and X' or X" represents at least one element selected from P, Si, S, V, Ti and Ge.

20. The process as claimed in claim 8, wherein the oxide CO2 is selected from $LiFePO_4$, $LiFeVO_4$, $Li_2FeSiO_4$, $LiFeTiO_4$ and $Li_2FeGeO_4$.

* * * * *